United States Patent Office 3,010,920
Patented Nov. 28, 1961

3,010,920
GLYCIDYL ETHERS OF HYDROXYPHENYLATED PETROLEUM RESINS
Sylvan Owen Greenlee, 343 Laurel Drive, West Lafayette, Ind.
No Drawing. Filed May 4, 1960, Ser. No. 26,676
19 Claims. (Cl. 260—18)

This invention relates to novel glycidyl ethers and to conversion products thereof. More particularly the invention relates to glycidyl ethers of hydroxyphenylated petroleum resins and to conversion products of such ethers.

While chemically resistant, infusible, insoluble materials may be prepared from properly formulated polyepoxide conversion products, many of these formulations based on the commercial polyepoxides leave much to be desired in resistance to aqueous systems. Such weakness, for example, to boiling water and water solutions is often exhibited by protective coatings prepared from the reaction of commercial polyepoxide resins with polyamines containing active hydrogen directly attached to nitrogen or with the widely used amino-amides such as the commercial products known as Versamids which are reaction products of long chain polymerized vegetable oil acids and aliphatic polyamines. Such systems which convert to infusible, insoluble materials through the reaction of an epoxide group with an active hydrogen directly attached to a nitrogen of an amide or amine group give amide or amine linkages in the tridimensional polymer resulting from the conversion reaction. It is well known that the carbon nitrogen linkage forming a part of the polymeric structure of these conversion products is one of the more hydrophilic linkages and in order to give satisfactory resistance to aqueous systems the overall polymers must possess sufficient hydrophobic portions to more than neutralize the hydrophilic character of the carbon nitrogen linkages. In many of the epoxide converting systems consisting of the reaction of polyepoxides with catalysts or with other active hydrogen coupling compounds the products also lack in the requisite overall hydrophobic character to give the desired resistance to aqueous systems. To illustrate, the conversion products prepared by catalytic polymerization of the aliphatic polyepoxides are usually subject to some deterioration as is often exhibited by whitening of the surface when exposed to boiling water.

It is generally known in the art that in order to prevent deterioration of protective coatings, and plastic objects in general which are to be exposed to the atmosphere, the plastic system must be of such hydrophobic character that water is not absorbed by the polymeric structure through attraction of one of the chemical linkages. It is sometimes possible to attain the desired hydrophobic character of a conversion system by simply building up extremely high molecular weights, although this method is not always applicable. The other method is that of building into the overall polymeric structure sufficient hydrophobic material to repel attraction of water molecules by the polar linkages used in polymerizing this system to the insoluble, infusible state. If molecules of water can make appreciable contact with polar linkages in the conversion system, the water then acts as a solvent for many elements of deterioration such as oxygen, alkali, acids, and salts which will in time destroy the organic materials. On the other hand, if the overall polymeric structure is of such hydrophobic character that water cannot make contact with the polar groups, regardless of how sensitive these groups might be to reaction with water or the other elements which would be solubilized by water, deterioration of the organic material does not occur.

One of the desirable means of introducing hydrophobic character to conversion systems would be that of introducing hydrocarbon structure which contains relatively few polar linkages in the nature of non-carbon linkages. It is, however, often difficult to find means of introducing large portions of hydrocarbon structures into the conversion systems due to the lack of proper functionality being present in the hydrocarbon materials. Another difficulty encountered in introducing the hydrophobic type hydrocarbon material into such conversion systems as the polyepoxide conversion mixtures is that of obtaining proper miscibility of all ingredients with each other.

Another weakness generally recognized in the use of commercial polyepoxides particularly in the more widely used glycidyl ethers is that these materials are of such highly polar structure that they have very limited solubility in the widely used hydrocarbon solvents and in other formulating materials such as coal tar and asphalt pitches having high hydrocarbon content. Formulation of products from these commercially known glycidyl ethers usually requires highly polar solvents such as the ketone and ester solvents and their use in conjunction with other resinous and polymeric materials is normally limited to materials possessing highly polar structures such as the formaldehyde condensates of phenol, urea, and melamine. In cases where the commercial glycidyl ethers have been blended with hydrocarbon materials such as coal tar (U.S. Patent 2,765,288) and asphalt material (U.S. Patent 2,906,720) it has been necessary to select the low molecular weight liquid glycidyl ethers in order to obtain satisfactory solubility and it has usually been necessary to restrict the use of coal tar and asphalt modification to those grades which contain high percentages of aromatic and cyclic structures with corresponding low percentages of the straight chain aliphatic structures. It is highly desirable to have glycidyl ether conversion systems which possess good solubility in the low solvency aliphatic modifiers and solvents.

It is well known, for example, in the formulation of coatings that the use of highly polar solvents such as the ketones and esters give products which are inherently limited in their application over undercoats, primers, and old coating films in that these solvents tend to redissolve the other coatings. On the other hand the formulation of coatings using aromatic hydrocarbon solvents are much less likely to redissolve primers, undercoats, and old coatings. The use of aliphatic hydrocarbon solvents in the formulation of coatings gives a product which is normally completely free from any solubilizing effect on precured coating films.

Another limitation on the use of highly polar solvents such as the ketone and ester solvents is that these materials tend to raise the grain of wood surfaces through their solubilizing effect of a portion of the chemical structure of the wood cells. It is, therefore considered impossible to use products based on such highly polar solvents in furniture finishing. On the other hand the effect of aromatic hydrocarbon solvents on raising the wood grain is relatively low in comparison to the ketone and ester solvents and the effect of aliphatic hydrocarbon solvents on the raising of wood grain is essentially negligible.

An effective means of accomplishing the desired hydrocarbon solubility and the desired resistance to aqueous systems would be that of introducing into the formulated product a high content of hydrocarbon. The introduction of high hydrocarbon content into the formulated composition would desirably and necessarily require sufficient modification of the hydrocarbon structure with functionality so as to give it thermoset character through its own functionality or through reaction of its functionality with other ingredients to be used in conjunction therewith in the formulated thermosetting system.

It is therefore a principal object of this invention to provide modified petroleum resins which can be thermoset.

It is more specifically a primary object of the invention to provide modified petroleum resins which readily react with cross linking agents, thermosetting resins or which self-polymerize to form infusible, insoluble products.

It is an additional object of the invention to provide modified petroleum resins which are readily soluble in commercially available hydrocarbon solvents and which may be thermoset by reaction with cross linking agents or polymerization catalyst.

Still another object of the invention is to provide modified petroleum resins which are readily soluble in commercially available coal tar and asphalt pitches and which may be thermoset in mixtures therewith by reaction with cross-linking agents or polymerization catalysts.

An additional object of the invention is to provide modified petroleum resins which are readily soluble in commercially available coal tar and asphalt pitches and react in mixtures therewith with or without the application of heat to effect a marked elevation of the softening point of the coal tar or asphalt pitch.

An additional object of the invention is to provide infusible, insoluble, plastic coatings and fabricated objects characterized by high resistance to water, alkali, acid, and polar and nonpolar organic and inorganic solvents.

The invention generically contemplates the glycidyl ethers of hydroxyphenylated-phenyletherated petroleum resins prepared by alkylating a phenol selected from a group consisting of monohydric and dihydric phenols having at least one unsubstituted ortho- or para-position on the aromatic nucleus to which a phenolic hydroxyl group is attached.

The unsaturated petroleum resins contemplated for use in forming the hydroxyphenylated resins which are converted to the new glycidyl ethers are known to the art. Such resins may be derived from cracking petroleum and from acid polymerization of petroleum fractions. The cracking of petroleum ordinarily yields gasoline which contains appreciable amounts of polymerizable unsaturates which must be removed in order to stabilize the gasoline. The nature of such unsaturated hydrocarbons is very complex, widely varied, and not completely defined as indicated by Wakeman, The Chemistry of Commercial Plastics, Reinhold, New York, 1947, pages 296–301. Such materials are thought to contain unsaturated allocyclic hydrocarbon structures which account for the fairly high degree of unsaturation. The unsaturated petroleum residues are essentially a byproduct of petroleum refining, are readily available at a price of 2¢ to about 10¢ per pound and are offered to the market under trade names on the basis of specifications which are normally restricted to physical data and percent unsaturation. Such materials vary from a heavy semi-flowing oil consistency to high melting solids and usually are very dark in color although some of the commercial versions now available are of light color.

Illustrative unsaturated petroleum residues are described in Table I entitled "Unsaturated Petroleum Hydrocarbon Resins." It will be noted that the examples illustrated in the table have iodine values ranging from 119 to 475, molecular weights ranging from 300 to 690, and olefin double bonds per molecule ranging from 2.76 to 6.37. Iodine value (or number) as used in tabulating this data represents the grams of iodine absorbed per 100 grams olefin. The number of double bonds per molecule would then equal $$\frac{\text{Iodine value} \times \text{m. wt.}}{254 \times 100}$$

The quantity 254 is the molecular weight of iodine. The equivalent weight to olefin group equals $$\frac{254 \times 100}{\text{Iodine value}}$$

The limits on iodine value, molecular weight and number of double bonds per molecule as tabulated in the table are not all inclusive of the operable unsaturated petroleum resins. Petroleum resins of somewhat higher molecular weight than those reported in the table are available. The contemplated petroleum residues are characterized by iodine values within the range of 100 to 500, molecular weight within the range of 250 to 2500 and of olefin content amounting to at least two double bonds per molecule.

The contemplated hydroxyphenylated-phenyletherated petroleum resins contain at least about 2.5% phenolic hydroxyl content by weight, an average of at least .75 phenolic hydroxyl group per molecule and a total phenol addition of at least about 8% by weight.

The new glycidyl ethers have equivalent weights to epoxide of up to about 2500 and they are completely soluble in hydrocarbon solvents.

TABLE I

*Unsaturated petroleum hydrocarbon resins*

| Petroleum residue and supplier | Percent non-volatile | Soft. pt. or visc. | Iodine value on non-volatile | Molecular weight range | Calculated average double bonds per mol. |
|---|---|---|---|---|---|
| Velsicol EL-528 (Velsicol Chemical Corporation) | 100 | 75–80 C (ball and ring) | 200 | 300–400 | 2.76 |
| Velsicol M-144 (Velsicol Chemical Corporation) | 87.5 | 5.0 poises, 9 parts to 1 in toluene | 170 | 300–400 | 2.34 |
| Hydropolymer Oil (Ethyl Corporation) | 55 | 0.5 poises | 430–475 | 300 | 5.34 |
| PDO-40 (Sun Oil Company) | 68 | 1.32 poises | 220 | | |
| Panapol 3E (Amoco Chemical Corporation) | 83 | 148 poises, 3.0 poises at 9 parts to 1 of toluene | 253 | 590–690 | 6.37 |
| Panapol 5C (Amoco Chemical Corporation) | 95 | 31.6 poises | 119 | 590–690 | 3.00 |
| Panapol 5D (Amoco Chemical Corporation) | 81 | 123.2 poises | 194 | 590–690 | 4.88 |
| Panarez 3-210 (Amoco Chemical Corporation) | 100 | 93–105 C (ASTM D36-26) | 225 | 690 | 6.10 |
| Panarez 6-210 (Amoco Chemical Corporation) | 100 | 99–107 C (ASTM D36-26) | 145 | 590 | 3.36 |
| Panarez 7-210 (Amoco Chemical Corporation) | 100 | 93–105 C (ASTM D36-26) | 160 | 670 | 4.20 |
| OTLA Polymer (Enjay Company Incorporated) | 94 | 3.5 poises, 9 parts to 1 in toluene | 240 | | |

Preferred glycidyl ethers of petroleum resins contain an epoxide equivalent weight of not more than about 1500. The glycidyl ethers of petroleum resins of particular significance accordingly are characterized by an epoxide equivalent weight from about 300 to about 1500.

The glycidyl ethers of petroleum resins also contain at least about 0.75 epoxide group per average molecule and preferably contain an average of at least about one epoxide per molecule. An appropriate range is from about one to ten epoxide groups per molecule.

The hydroxyphenylated-phenyletherated petroleum resins used in forming the glycidyl ethers for this invention and detailed methods for the preparation thereof are fully described in the co-pending application Serial Number 16,150, the pertinent disclosures of which are incorporated herein by reference. Such hydroxyphenylated resins and processes do not per se form a part of this invention and therefore will not be described in detail in this specification. In general the contemplated hydroxyphenylated petroleum resins are prepared by the alkylation of a monohydric or dihydric phenol in the presence of an alkylation catalyst such as boron trifluoride, aluminum fluoride, aluminum phenoxide, aluminum chloride, iron chloride, and antimony chloride with the unsaturated petroleum resins which are liquid at the reaction temperature or sufficiently soluble in organic solvents to permit the alkylation reaction to proceed.

As indicated in the afore mentioned co-pending application all monohydric and dihydric phenols which may be alkylated with the specified unsaturated petroleum residues are contemplated for production of the hydroxyphenylated-phenyletherated resins. The preferred phenols are: phenol, the cresols, and resorcinol.

Representative hydroxyphenylated-phenyletherated petroleum resins together with the general methods utilized for the preparation thereof are described as Examples 1 through 11 in Table II. Example 12 describes the preparation of a co-hydroxyphenylated mixture of a butadiene copolymer and an unsaturated petroleum resin. Example 13 describes the preparation of a phenol adduct of a liquid butadiene polymer. In certain cases it is advantageous to obtain glycidyl ethers from chemical or physical blends with other hydroxyphenylation products prepared from other polyenes—such as butadiene polymers or copolymers and unsaturated vegetable or fish oils. The products of Examples 12 and 13 are illustratively incorporated into mixed glycidyl products described in Table III.

the indicated solvent (or without solvent), and the $BF_3$ ether catalyst. The reaction mixture is raised to the indicated reaction temperature and addition of the polyene begun. The addition is at such rate that the temperature does not rise above the desired reaction temperature from exothermic heat. Addition is normally carried out over a period of 10–30 minutes, applying heat if necessary or cooling the flask externally with a pan of tap water if required to hold the reaction temperature. At the end of the reaction period the temperature is lowered to 90° C. or below by adding toluene in a quantity equal to the weight of the reaction mixture (added slowly through condenser). Hot water in an amount approximating the weight of the reaction mixture is then added. With continuous agitation the mixture is heated at 80° C. for 10–15 minutes and allowed to separate into water and organic layers. In case layering is not satisfactory because of emulsification, 20 to 50 ml. of acetic acid is added to the wash. The water layer is removed and the washing with 80° C. tap water repeated two more times. The flask is then provided with a salt-ice bath cooled receiver and the mixture heated with rapid agitation until the pot temperature reaches 150–160° C. at which point the pressure is reduced to 15–20 mm. of mercury by using a water pump. The batch is held about 15 minutes at this pressure keeping the pot temperature at 150–250° C. depending on the softening point of the final product (softening points as used throughout this description were determined by Durran's Mercury Method, Journal of Oil and

TABLE II

*Preparation of hydroxy-phenylated petroleum resins*

| Ex. No. | Grams phenol and ml. solvent | Grams polyene and ml. solvent | Mols phenol/ eq. polyene | Catalyst/100 g. polyene | Hours at ° C. |
|---|---|---|---|---|---|
| 1 | 750 o-cresol | 500 (N.V.) Panapol 3E | 1.39 | 1.00 g. Al | 3 at 200–205. |
| 2 | 1,080 o-cresol | 212 (N.V.) CTLA polymer | 5.0 | 2.36 g. Al | 3 at 190–195. |
| 3 | 1,000 phenol | 415 (N.V.) Panapol 3E | 2.58 | 1.20 g. Al | 1.5 at 180–185. |
| 4 | 940 phenol | 112 (N.V.) hydropolymer oil | 5.0 | 35.7 ml. $BF_3$·ether | 1 at 100–105, 2 at 120–125. |
| 5 | 1,880 phenol | 200 (N.V.) Panapol 3E | 10.00 | 12.5 ml. $BF_3$·ether | 6 at 100–125. |
| 6 | 940 phenol | 226 Panarez 3–210 | 5.0 | 17.7 ml. $BF_3$·ether | 1 at 100–105, 2 at 120–125. |
| 7 | 940 phenol | 254 Velsicol EL 528 | 5.0 | 15.75 ml. $BF_3$·ether | 1 at 100–105, 2 at 120–125. |
| 8 | 1,880 phenol | 254 Velsicol EL 528 | 10.0 | 19.7 ml. $BF_3$·ether | 1 at 100–105, 2 at 120–125. |
| 9 | 330 resorcinol | 212 (N.V.) CTLA polymer | 3.0 | 4.5 ml. $BF_3$·ether | 1 at 100–105, 2 at 120–125. |
| 10 | 330 resorcinol | 261 (N.V.) Panapol 5D | 3.0 | 3.81 ml. $BF_3$·ether | 1 at 100–105, 2 at 120–125. |
| 11 | 1,000 phenol | 250 (N.V.) Panapol 3E | 4.25 | 3.2 g. Al | 3 at 250. |
| 12 | 2,000 o-cresol | 500 Butarez 5 [1] | 2.5 | 0.50 g. Al | 3 at 190–195. |
| 13 | 1,000 phenol | 400 Buton 100,[2] 100 Panarez 6–210 | 2.0 | 0.50 g. Al | 1.5 at 180–185. |

| Ex. No. | Grams product | Percent by wt. added phenol | Soft. pt. and/or visc. | Acid value | Percent wt. as OH | Percent wt. as $-\phi OH$ | Percent wt. as $\phi O-$ | Percent phenol addition as $-\phi OH$ | Eq. phenol used in prep./eq. phenol in product | Percent phenol addition as $\phi O-$ | Eq. wt. | Min. mol. wt. | Min. OH/mol. |
|---|---|---|---|---|---|---|---|---|---|---|---|---|---|
| 1 | 850 | 41.2 | 102 | 0.6 | 3.66 | 28.2 | 18.0 | 56.4 | 3.9 | 43.6 | 465 | 1,090 | 2.34 |
| 2 | 293 | 30.4 | 85 | 2.0 | 3.42 | 21.7 | 8.7 | 70.8 | 18.8 | 29.2 | 497 | | |
| 3 | 671 | 38.2 | 106 | 0.16 | 3.51 | 19.3 | 21.0 | 48.0 | 8.1 | 52.0 | 485 | 1,035 | 2.1 |
| 4 | 216 | 48.1 | 50 | 3.9 | 4.81 | 26.5 | 21.6 | 55.2 | 9.0 | 44.8 | 354 | 583 | 1.65 |
| 5 | 355 | 43.7 | 121 | 1.8 | 4.91 | 27.0 | 16.7 | 61.9 | 19.7 | 38.1 | 346 | 1,138 | 3.28 |
| 6 | 291 | 22.3 | 164 | 6.2 | 3.19 | 17.6 | 4.7 | 79.0 | 9.2 | 21.0 | 534 | 888 | 1.66 |
| 7 | 345 | 26.4 | 127 | 3.1 | 4.34 | 23.9 | 2.5 | 90.5 | 11.4 | 9.5 | 392 | 475 | 1.21 |
| 8 | 351 | 27.6 | 122 | 6.5 | 5.05 | 27.8 | 0 | 100.0 | 19.3 | 0 | 336 | 483 | 1.44 |
| 9 | 276 | 23.2 | 130 | 6.6 | 6.66 | 21.5 | 1.8 | 92.6 | 5.6 | 7.4 | 255 | | |
| 10 | | | 148 | 2.6 | 7.83 | 25.3 | | | | | 217 | | |
| 11 | 372 | 32.8 | 104 | 0.2 | 4.16 | 23.8 | 9.0 | 72.6 | 11.3 | 27.4 | 408 | | |
| 12 | 833 | 40.0 | 112 | 0.6 | 5.38 | 34.3 | 5.7 | 85.8 | | 14.2 | 315 | 954 | 2.33 |
| 13 | 670 | 25.4 | 143 | | 3.7 | 20.4 | 5.0 | 80.2 | | 19.8 | 460 | 8,940 | 18.9 |

[1] Butarez (Phillips Petroleum Company) represents liquid butadiene polymers composed of approximately 55–65% 1,2- addition and 35–45% of 1,4- addition units. These polymers contain on the average 0.8 double bonds per $C_4$ unit giving iodine values of 375 to 400. Butarez 5 has a viscosity of 36–37 poises at 25° C. and 5.5 poises as a 90% solution in toluene at 25° C.

[2] Buton 100 obtained from Enjay Company, Inc. is described as a copolymer of butadiene and styrene having a molecular weight in the range of 8,000 to 10,000; an iodine value of approximately 300, and a composition of approximately 80 parts butadiene and 20 parts styrene. The butadiene content is described as composed of approximately 40% 1,4- addition and 60% 1,2- addition. Buton 100 has a specific gravity of 0.915 at 25° C. and a viscosity of around 10 poises as a 90% solution in toluene.

The general procedure used in preparing the hydroxyphenylation products described in Table II and using $BF_3$ catalyst is given as follows:

In a 3-neck flask provided with a thermometer, a mechanical agitator, a dropping funnel, an electrical heating mantle and a pan of tap water to be used for cooling the reaction if necessary, is placed the phenol dissolved in Color Chemists' Association, 12, 173–175, 1929). In order to keep the hydroxyphenylated petroleum resin sufficiently fluid for good agitation, the pot temperature at this stage is maintained at an estimated 50° C. above the softening point of the final product. The receiving flask is then connected to a vacuum pump and the pressure reduced to 1 to 5 mm. of mercury holding this pressure for 10–15 minutes while holding the pot temperature of the constantly agitated product at a temperature estimated to be 50° C. above the softening point. The product is poured into a suitable container and allowed to cool.

The general procedure used in preparing the hydroxyphenylation products described in Table II and using aluminum phenoxide catalyst differs from the above procedure for BF$_3$ preparation as follows:

The aluminum foil or turnings is dissolved in the phenol at a temperature of 150° C. or higher as necessary for the specific phenol after which the pot temperature is adjusted to the specified reaction temperature. With all washed batches sufficient acid is added to convert the aluminum to a water soluble salt.

The tabulated hydroxyl values were determined by reaction with excess acetyl chloride followed by titration with alkali as described more completely in my copending application, S.N. 833,144.

The glycidyl ethers of the invention are prepared by reacting hydroxyphenylated-phenyletherated petroleum resins with a halohydrin selected from the group consisting of epichlorohydrin, epibromohydrin, glycerol dichlorohydrin and glycerol dibromohydrin in the manner well known to the art for the production of glycidyl ethers as described, for example, in U.S. Patents 2,801,227 and 2,467,171. In general the glycidyl ethers of the invention may appropriately be prepared by the addition of hydroxyphenylated-phenyletherated petroleum resins to the halohydrin utilized in a quantity of about 0.75 mol of halohydrin per equivalent weight of phenolic hydroxyl group and usually more than one mole of halohydrin per equivalent of phenolic hydroxyl present in the resin reactant and thereafter adding an alkali metal hydroxide such as sodium or potassium hydroxide to the mixture to effect the desired etherification reaction. It is convenient to dissolve the hydroxyphenylated-phenyletherated petroleum resin in the halohydrin, and to utilize a supplemental solvent, if necessary, to afford the proper viscosity in the reaction mixture. The mixture of petroleum resin and halohydrin is preferably heated to a temperature in the range of about 100–120° C. Aqueous alkali metal hydroxide of a concentration of about 15–50% by weight is thereafter gradually added to the reaction mixture. At temperatures in excess of 100° C. the water added with the hydroxide and formed in the reaction is removed by distillation azeotropically with halohydrin. The condensed azeotrope separates into an aqueous phase and the halohydrin or halohydrin-organic phase is returned to the reaction mixture.

The sodium hydroxide is utilized in an amount preferably of about 0.1 to about 5% in excess of the stoichiometric quantity of halide group to be reacted. Alternatively, the alkali metal hydroxide may be added as an alcohol solution. Alkoxides, specifically sodium and potassium alkoxides, may be utilized in lieu of the corresponding hydroxides.

On completion of the etherification reaction, unreacted halohydrin and any solvent present may appropriately be removed by distillation or by other means familiar to the art. The residue of the reaction mixture will consist primarily of the desired glycidyl ether of the hydroxyphenylated-phenyletherated petroleum resin and alkali halide and is appropriately treated with a solvent such as xylene or toluene to dissolve the glycidyl composition. The salt is thereafter removed by filtration and the filtrate stripped of volatile materials under reduced pressure to provide the desired glycidyl composition.

Representative examples of glycidyl ethers of hydroxyphenylated-phenyletherated petroleum resins contemplated by the invention together with reactants and reaction conditions utilized are reported in Table III entitled "Glycidyl Ethers of Hydroxyphenylated Petroleum Resins." The general procedure utilized in production of the glycidyl ethers reported in Table III was as follows:

The indicated hydroxyphenylated-phenyletherated petroleum resin, halohydrin, and solvent were combined in a 3-neck flask fitted with a stirrer, condenser, two dropping funnels and a thermometer. The condenser was attached to the flask through a water leg (Dean-Stark) to effect removal of water from the system. Heat was applied to effect solution of the petroleum resin in the halohydrin. Agitation was initiated as soon as sufficient homogenienty of the petroleum resin and halohydrin was obtained. The reaction temperature was adjusted to the indicated range. A 40% aqueous solution of sodium hydroxide in an amount equivalent to provide 1.01 mols of sodium hydroxide per equivalent of phenolic hydroxyl group was added drop-wise with continuous agitation. The water layer as formed in the water leg was discarded and the separated halohydrin layer was returned to the reaction mixture.

The rate of addition of sodium hydroxide was contemplated to preclude the exothermic reaction from reaching a temperature in excess of that indicated in Table III. Sodium hydroxide addition normally required a period from about 1.5 to about 1.75 hours. Upon completion of the sodium hydroxide addition, heating of the reaction mixture was continued for the remainder of the reaction time indicated in Table III.

Thereafter the condenser was adjusted for distillation and the reaction mixture was heated and stirred until the temperature reached about 150° C., at which time the pressure was gradually reduced to about 15–20 mm. of mercury by a water pump, thereby permitting the temperature to reach a maximum of 160° C. At this point the reaction mixture was allowed to cool to about 120° C. and treated with xylene in an amount corresponding to about 2 to 3 times the weight of the polyene utilized. After thorough agitation, the reaction mixture was filtered to remove the insoluble sodium chloride. The

TABLE III

*Glycidyl ethers of hydroxyphenylated petroleum resins*

| Ex. No. | Equivalents of hydroxyphenyl resin | Mols epichlorohydrin | Mols 40% aqueous NaOH | Reaction time in hours at ° C. | Softening point ° C. | Epoxide equiv. weight |
|---|---|---|---|---|---|---|
| 1a | 0.50 of Ex. 1 | 2.50 | 0.51 | 1.83 at 103–117 | 102 | 884 |
| 2a | 0.40 of Ex. 2 | 2.00 | 0.42 | 1.50 at 108–113 | 78 | 830 |
| 3a | 0.50 of Ex. 3 | 1.00 | 0.51 | 1.43 at 111–120 | 102 | 1,024 |
| 4a | 0.40 of Ex. 4 | 2.00 | 0.42 | 1.75 at 107–113 | 30 | 583 |
| 5a | 0.60 of Ex. 5 | 3.00 | 0.61 | 1.00 at 108–112 | 97 | 598 |
| 6a | 0.30 of Ex. 6 | [1] 1.50 | 0.305 | 1.00 at 103–118 | 159 | 1,064 |
| 7a | 0.17 of Ex. 7 | 0.51 | 0.175 | 0.85 at 116–118 | 105 | 609 |
| 8a | 0.75 of Ex. 8 | 3.75 | 0.76 | 1.42 at 108–116 | 105 | 593 |
| 9a | 0.50 of Ex. 9 | 2.00 | 0.52 | 1.75 at 107–118 | 119 | 515 |
| 10a | 0.50 of Ex. 10 | 2.00 | 0.52 | 1.50 at 111–117 | 125 | 543 |
| 11–12a | 0.75 of Ex. 11, 0.97 of Ex. 12 | 8.25 | 1.74 | 2.00 at 103–117 | 89 | 745 |
| 13a | 0.75 of Ex. 13 | 3.75 | 0.76 | 1.50 at 102–109 | | 1,135 |

[1] And 150 ml. xylene.

separated sodium chloride was washed with solvent, and the washings were combined with the glycidyl ether solution. The glycidyl ether solution was then gradually heated to a temperature of about 150° C. under a vacuum of about 15–20 mm. mercury, which was ultimately reduced to 3–5 mm. of mercury, permitting the temperature to reach a maximum of about 160–190° C. requisite to maintain the glycidyl ether sufficiently fluid for continuous agitation. The hot, liquid glycidyl ether product was then poured from the flask into a cooling pan.

Epoxide contents of the glycidyl ethers were measured by heating samples which corresponded to approximately one gram sample per each 400 in equivalent weight with an excess of pyridine containing pyridine hydrochloride (made by adding 16 ml. of concentrated hydrochloric acid per liter of pyridine) at the boiling point for 20 minutes and back-titrating the excess pyridine hydrochloride with .1 N KOH using phenolphthalein as indicator and considering that 1 mol of the HCl is equivalent to one epoxide group.

Although molecular weights of the glycidyl ethers are not available to relate the epoxide equivalent weight to the molecular weights it will be recognized from the phenolic hydroxyl content and molecular weight range of the hydroxyphenylated petroleum resins that the glycidyl ethers are in general compositions containing on the average at least about 0.75 and preferably from one to about ten epoxide groups per molecule.

The glycidyl ether group is known to the art to be exceedingly reactive. As a functional group of the hydroxyphenylated petroleum resins contemplated by this invention, the glycidyl ether group is effective for conversion of such petroleum resins into thermosetting materials with any of the various converting agents known to be useful for the conversion of epoxides. The invention accordingly embraces generically all epoxide-converting agents, including specifically such converting agents as primary and secondary polyamines, organic polybasic acids and their anhydrides, formaldehyde condensates of phenols and urea or melamine derivatives, tertiary amines, polyamines, polymercaptans, polyhydric phenols, Lewis acids including $BF_3$ and the mineral acids, alkali phenoxides and polyhydrazides. More particularly, the glycidyl ethers of the invetnion may be converted to thermosetting materials by all of the various active hydrogen-containing compounds and by catalysts effective to polymerize epoxide groups.

The hydroxyphenylated - phenyletherated materials which contain an average of at least about 2 phenolic hydroxyl groups per molecule contain active hydrogen and constitute an excellent class of coupling agents for the glycidyl ethers of this invention. The hydroxyphenylated-phenyletherated materials may be formed by the reaction of a phenol with a material selected from the group consisting of unsaturated petroleum resins, unsaturated polymers of butadiene and its homologues, unsaturated copolymers of butadiene and its homologues with vinyl unsaturated monomers, natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and dihydric alcohols, phenolic esters of unsaturated aliphatic acids having from about 12 to about 22 carbon atoms per molecule, unsaturated aliphatic alcohols having from about 12 to about 22 carbon atoms per molecule, and esters of unsaturated aliphatic alcohols having from about 12 to about 22 carbon atoms per molecule with carboxylic acids. Such materials may be produced in a manner analogous to that described in the co-pending application S.N. 833,144. The materials which may be hydroxyphenylated are described in detail in co-pending applications, S.N. 16,136; S.N. 16,150 and S.N. 833,144. The average number of phenolic hydroxyl groups per molecule in the hydroxyphenylated material best suited for a given application will depend upon a variety of facts. For example, as the molecular weight of the coupling material increases it generally is advantageous to increase the average number of phenolic hydroxyl groups per molecule. However, since the precise phenolic hydroxyl content of the coupling agent will depend upon the specific application, this invention generically contemplates all of the above hydroxyphenylated materials which contain on the average of at least about two phenolic hydroxyl groups per molecule. A catalyst such as a standard tertiary amine catalyst most appropriately is employed in conversion systems which contain these hydroxyphenylated materials.

Another desirable group of coupling agents comprises the amino amides which are the reaction products of polyalkylene polyamines and dimerized vegetable oil acids. Such products are sold by the General Mills Company under the trade name "Versamids." Similar valuable converting agents result from reaction of the polyalkylene polyamines in stoichiometric excess quantities with the monomeric vegetable oil acids. It will be appreciated that conversion systems which cure at room temperature or at elevated temperatures may be formulated in accordance with the knowledge of the art by selection of the appropriate coupling agent.

The infusible, insoluble conversion product of the glycidyl ethers of the invention may be formulated as solvent solutions to provide valuable coating materials. Alternatively, the glycidyl ethers of the invention may be reacted with converting agents in the essential absence of solvents to provide molded objects.

Useful products are also prepared by the incorporation of reactive and non-reactive materials in the mixtures of the glycidyl ethers of the invention with appropriate coupling agents or catalysts. Representative additional reactive materials include resinous materials such as the formaldehyde condensates of urea and melamine.

A particularly advantageous modification of the glycidyl ether conversion systems contemplated by the invention embraces mixtures thereof with coal tars and asphalts which, upon conversion, yield materials useful as underground pipe coatings and in road building. The unique solubility of the new glycidyl ethers in hydrocarbons as compared to the solvency requirements of ketone and ester solvents for commercially known epoxide resins makes them very advantageous in formulation in mixtures with these cheap hydrocarbon coal tar and asphalt materials. Small portions as low as 5 to 10% of the total formulation weight as coal tar or asphalt contribute to the flexibility of the converted system. Conversely, incorporation of as low as 5 to 10% of the total formulation weight as the new glycidyl ether with a converting agent gives appreciable elevation of the softening point of the coal tar and asphalt materials. Compositions containing from 10 to 90% of the total weight as coal tar or asphalt are particularly advantageous. U.S. Patent 2,765,288 describes the formulation of some coatings based on mixtures of some commercial epoxides with coal tar pitch. U.S. Patent 2,906,720 describes the formulation of similar coatings based on some commercial epoxides and high aromatic content petroleum asphalt. With the new glycidyl ethers their solubility in hydrocarbons is such that their use in modifying coal tar and asphalt compositions applies to the complete range of low and high aromatic content pitches. The epoxide conversion systems based on the new glycidyl ethers demonstrate a marked effect of hardening and insolubilizing of tars and asphalts and yield products superior to the analogous products known to the prior art.

Examples 1b through 13b illustrate the capacity of the glycidyl ethers described in Table III as Examples 1a through 13a to form infusible products and to elevate the softening point of such widely used commercial materials as asphalt. Viscosities represented by the examples were determined by a Gardner bubble viscometer. Film hardness was measured with a Sward rocker with the value for a flat glass plate set at 100. GL hardness-adhesion readings are reported as the number of grams weight required to scratch the surface in one case and to completely remove the film from the panel in the other case as determined from a Graham-Linton hardness tester. The bend tests were run using a mandrel set manufactured by the Gardner Laboratory, Inc. Wet films of 0.003" thick were spread on 30 gauge, bright, dry finish coke 3" x 5" tin planes cured by baking as indicated in the examples and bent sharply around a steel rod of the size indicated in the examples.

*Example 1b.*—A mixture of 4.5 parts of the glycidyl ether of Example 1a, 1 part of a diglycidyl ether of bis-(4-hydroxyphenyl) dimethyl methane having an epoxide equivalent weight of 175 and 2 parts of Versamid 115 diluted to 50% nonvolatile content in xylene was spread in a 0.003″ wet film. Versamid 115 is an amino-amide prepared by the reaction of a polyethylene polyamine with dimerized vegetable oil acids to give a viscosity of 500–750 poises at 40° C., an amine value of 210–230 and available from the chemical division of General Mills, Inc. Films baked for 15 minutes at 150° C. gave a rocker hardness of 38, a GL film scratch value of 650, and a GL removal value from glass plate of 900. A similar baked film applied to tin plate passed a bend test of ¼ inch.

*Example 3b.*—A mixture of 10.3 parts of the glycidyl ether of Example 3a and 1.3 parts of phthalic anhydride was fused to a homogeneous solution and then baked for 3 hours at 150° C. to give an infusible object possessing no tackiness at the baking temperature.

*Example 5b.*—A mixture of 6 parts of the glycidyl ether of Example 5a and 2 parts of Versamid 115 dissolved in xylene to give 50% nonvolatile content had a viscosity of N. Films of 0.003″ wet thickness were spread on glass plate and on tin plate and baked for 0.5 hour at 150° C. The films passed a ⅛″ bend test. Films on glass plate showed no deterioration on 24 hour immersion at 100° C. in methyl isobutyl ketone, mineral spirits, water, toluene, 50% aqueous sulfuric acid, 10% aqueous sodium hydroxide or glacial acetic acid.

*Example 7b.*—A mixture of 6 parts of the glycidyl ether of Example 7a and 0.9 part maleic anhydride was fused to a homogeneous solution and then heated for two hours at 150° C. to give an infusible object possessing no tackiness at the baking temperature.

*Example 9b.*—A mixture of 5 parts of the glycidyl ether of Example 9a and 2 parts of Versamid 115 were dissolved in xylene to give a nonvolatile content of 50%. Films of 0.003″ wet thickness gave cure to a flexible material on standing for 15 hours at room temperature or by baking for 0.5 hour at 150° C. The films passed a ⅛″ bend test. The baked films showed no deterioration on immersion for 24 hours at 100° C. in methyl isobutyl ketone, mineral spirits, toluene, water, 50% aqueous sulfuric acid or 10% aqueous sodium hydroxide.

Three samples of the 50% xylene solution were blended with asphalt cement (120/150 penetration asphalt obtained from Socony Mobil Oil Company) in portions to give percentages of the nonvolatile content as asphalt of 25, 50 and 75. The product containing 25% of the nonvolatile content as asphalt gave conversion of 0.003″ wet films to flexible tack free surfaces on standing for 15 hours at room temperature or on baking for 0.5 hour at 150° C. The room temperature cured product gave a rocker hardness of 24, a GL scratch value of 200 and a GL surface removal from glass plate of 750 while the baked films gave corresponding values of 30, 500 and 900. The baked film showed no deterioration on immersion for 24 hours at 100° C. in methyl isobutyl ketone, 50% aqueous sulfuric acid and 10% aqueous sodium hydroxide. The products containing 50 and 75% asphalt did not completely lose their hot tack but would not flow on heating at 150° C.

*Example 10b.*—A mixture of 5.5 parts of the glycidyl ether of Example 10a and 3 parts of trimerized soya bean oil acids were dissolved in xylene to give a 50% nonvolatile content having a viscosity of G. Films of 0.003″ wet thickness baked for 0.5 hour at 175° C. gave a bend test of ⅛″ and withstood 24 hour immersion at 100° C. in methyl isobutyl ketone, mineral spirits, toluene, glacial acetic acid, water, 50% aqueous sulfuric acid and 10% aqueous sodium hydroxide.

*Examples 11–12b.*—A mixture of 7.5 parts of Examples 11–12a and 2 parts of Versamid 115 dissolved in toluene to a nonvolatile content of 60% to give a viscosity of T. Films of 0.003″ wet thickness baked for 0.5 hour at 150° C. gave a bend test of ⅛″ and no deterioration on 24 hour immersion at 100° C. in mineral spirits, toluene, glacial acetic acid, water, 50% aqueous sulfuric acid and 10% aqueous sodium hydroxide.

*Example 13b.*—A mixture of 11 parts of the glycidyl ether of Example 13a and 2 parts of Versamid 115 dissolved in xylene to a 50% nonvolatile content to give a viscosity of G. Films of 0.003″ wet thickness baked for 0.5 hour at 150° C. gave a bend test of ⅛″, a GL scratch value of 700 and a GL removal value of 1200.

Three samples of the 50% xylene solution were blended with asphalt (120/150 penetration) in portions to give percentages of the nonvolatile content as asphalt of 25, 50 and 75. Films of 0.003″ wet thickness of the three asphalt varnishes were baked for 0.5 hour at 150° C. to give a rocker hardness of 38 on the 25% asphalt film, 20 for the 50% asphalt film and 10 for the 75% asphalt film. The 75% asphalt film was slightly tacky.

I claim:

1. A glycidyl ether formed by the reaction of a halohydrin selected from the group consisting of epichlorohydrin, epibromohydrin, glycerol dichlorohydrin and glycerol dibromohydrin with a hydroxyphenylated-phenyl-etherated polymer prepared by alkylating a phenol selected from the group consisting of monohydric and dihydric phenols having at least one of the ortho- and para-position carbon atoms unsubstituted on an aromatic nucleus to which a phenolic hydroxyl group is attached, with an unsaturated petroleum resin having an iodine value of from about 100 to about 500, an average molecular weight of from about 250 to about 2500 and containing an average of at least two double bonds per molecule, said material containing at least about 2.5% phenolic hydroxyl by weight, an average of at least 0.75 phenolic hydroxyl groups per molecule and a total phenol addition of at least about 8% by weight, said glycidyl ether being characterized by an average epoxide content of at least about 0.75 epoxide groups per molecule.

2. The glycidyl ether of claim 1 which contains on the average of at least about one epoxide group per molecule.

3. The glycidyl ether of claim 1 characterized by an average epoxy content of from about 1 to about 10 epoxide groups per molecule.

4. The glycidyl ether of claim 1 characterized by an epoxide equivalent weight of from about 300 to about 1500.

5. A process for preparing a glycidyl ether which comprises reacting a halohydrin selected from the group consisting of epichlorohydrin, epibromohydrin, glycerol dichlorohydrin and glycerol dibromohydrin with a hydroxyphenylated-phenyletherated polymer prepared by alkylating a phenol selected from a group consisting of monohydric and dihydric phenols haivng at least one of the ortho- and para-position carbon atoms unsubstituted on an aromatic nucleus to which a phenolic hydroxyl group is attached, with an unsaturated petroleum resin having an iodine value of from about 100 to about 500, an average molecular weight of from about 250 to about 2500 and containing an average of at least two double bonds per molecule, said material containing at least about 2.5% phenolic hydroxyl by weight, an average of at least 0.75 phenolic hydroxyl groups per molecule and a total phenol addition of at least about 8% by weight, said glycidyl ether being characterized by an average epoxide content of at least about 0.75 epoxide groups per molecule.

6. The process of claim 5 wherein a stoichiometric excess of halohydrin is employed based upon the phenolic hydroxyl content of the polymer reactant.

7. The process of claim 5 wherein the final product is characterized by an average of at least about 1 epoxide group per molecule.

8. A curable mixture which comprises an epoxide converting agent and a glycidyl ether formed by reacting a halohydrin selected from the group consisting of epichlorohydrin, epibromohydrin, glycerol dichlorohydrin and glycerol dibromohydrin with a hydroxyphenylated-phenyletherated polymer prepared by alkylating a phenol selected from the group consisting of monohydric and dihydric phenols having at least one of the ortho- and para-position carbon atoms unsubstituted on an aromatic nucleus to which a phenolic hydroxyl group in attached, with an unsaturated petroleum resin having an iodine value of from about 100 to about 500, an average molecular weight of from about 250 to about 2500 and containing an average of at least two double bonds per molecule, said material containing at least about 2.5% phenolic hydroxyl by weight, an average of at least 0.75 phenolic hydroxyl groups per molecule and a total phenol addition of at least about 8% by weight, said glycidyl ether being characterized by an average epoxide content of at least about 0.75 epoxide groups per molecule.

9. The curable mixture of claim 8 wherein the converting agent is the reaction product of a polyalkylene polyamine and a dimerized vegetable oil acid.

10. The composition of claim 8 wherein the converting agent is a hydroxyphenylated-phenylethereated material selected from the group consisting of unsaturated petroleum resins, unsaturated polymers of butadiene and its homologues, unsaturated copolymers of butadiene and its homologues with vinylyl unsaturated monomers, natural oils which are glycerol esters of unsaturated aliphatic acids having from about 12 to about 22 carbon atoms per molecule, synthetic esters of unsaturated aliphatic acids having from about 12 to about 22 carbon atoms per molecule, unsaturated aliphatic alcohols having from about 12 to about 22 carbon atoms per molecule, and esters of unsaturated alcohols having from about 12 to about 22 carbon atoms per molecule with carboxylic acids.

11. The curable mixture of claim 8 also containing hydrocarbon materials selected from the group consisting of coal tar and asphalts and mixtures thereof, said mixture containing from about 5 to about 95% based on the total weight of the mixture of said hydrocarbon material.

12. The mixture of claim 11 containing from about 10 to about 90% of said hydrocarbon material.

13. A cured resinous material which comprises the reaction product of an epoxide converting agent and a glycidyl ether formed by reacting a halohydrin selected from the group consisting of epichlorohydrin, epibromohydrin, glycerol dichlorohydrin and glycerol dibromohydrin with a hydroxyphenylated-phenylethereated polymer prepared by alkylating a phenol selected from the group consisting of monohydric and dihydric phenols having at least one of the ortho- and para-position carbon atoms unsubstituted on an aromatic nucleus to which a phenolic hydroxyl group is attached, with an unsaturated petroleum resin having an iodine value of from about 100 to about 500, an average of at least two double bonds per molecule, said material containing at least about 2.5% phenolic hydroxyl by weight, an average of at least 0.75 phenolic hydroxyl groups per molecule and a total phenol addition of at least about 8% by weight, said glycidyl ether being characterized by an average epoxide content of at least about 0.75 epoxide groups per molecule.

14. The composition of claim 13 wherein the converting agent is the reaction product of a polyalkylene polyamine and a dimerized vegetable oil acid.

15. The product of claim 13 also containing hydrocarbon materials selected from the group consisting of coal tars and asphalts and mixtures thereof, said mixture containing from about 5 to about 95% based on the total weight of the mixture of said hydrocarbon material.

16. The composition of claim 13 containing from about 10 to about 90% of said hydrocarbon material.

17. The composition of claim 13 wherein the converting agent is a hydroxyphenylated-phenylethereated material selected from the group consisting of unsaturated petroleum resins, unsaturated polymers of butadiene and its homologues, unsaturated copolymers of butadiene and its homologues with vinylly unsaturated monomers, natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and dihydric alcohols, phenolic esters of unsaturated aliphatic acids having from about 12 to about 22 carbon atoms per molecule, unsaturated aliphatic alcohols having from about 12 to about 22 carbon atoms per molecule, and esters of unsaturated alcohols having from about 12 to about 22 carbon atoms per molecule with carboxylic acids.

18. The product of claim 17 also containing hydrocarbon materials selected from the groups consisting of coal tars and asphalts and mixtures thereof, said mixture containing from about 5 to about 95% based on the total weight of the mixture of said hydrocarbon material.

19. The composition of claim 17 containing from about 10 to about 90% of said hydrocarbon material.

No references cited.